United States Patent [19]
Seiden

[11] 3,810,691
[45] May 14, 1974

[54] PHOTOGRAPHIC APPARATUS INCLUDING RESILIENT MIRROR MOUNT

[75] Inventor: Myron A. Seiden, Needham, Mass.

[73] Assignee: Polaroid Corporation, Cambridge, Mass.

[22] Filed: Aug. 12, 1971

[21] Appl. No.: 171,353

Related U.S. Application Data

[62] Division of Ser. No. 78,032, Oct. 5, 1970, Pat. No. 3,641,886.

[52] U.S. Cl............... 350/288, 350/310, 95/42
[51] Int. Cl. .............................................. G02b 5/08
[58] Field of Search .......... 350/6, 7, 285, 288, 310; 95/42

[56] References Cited
UNITED STATES PATENTS

| | | | |
|---|---|---|---|
| 2,552,275 | 5/1951 | Harvey | 95/42 |
| 2,698,561 | 1/1955 | Crowell | 95/11 R |
| 1,173,083 | 2/1916 | Banks | 95/11 R |
| 2,719,468 | 10/1955 | Steiner | 95/42 |
| 3,404,615 | 10/1968 | Proffitt, Jr. | 95/42 |
| 3,646,868 | 3/1972 | Sekida | 95/42 |
| 1,890,166 | 12/1932 | Shatto et al. | 350/310 |
| 3,383,152 | 5/1968 | Ward | 350/288 |
| 3,208,344 | 9/1965 | Staunton | 350/310 |

Primary Examiner—Ronald L. Wibert
Assistant Examiner—Michael J. Tokar

[57] ABSTRACT

In an optical system, for example, in a camera, a light reflective unit and associated system. In terms of completing one light path or being moved out of the way to facilitate the completion of another light path, a light reflective element precisely repeatably locatable in the one light path. Associated structure for so moving the light reflective element by moving the light reflective unit. Light baffle means movable with the reflective unit to prevent reflection from the reflective element in the out of the way situation of the reflective unit. Resilient mounting of the reflective element in the reflective unit. Precisely located stop means operative with respect to the reflective element to precisely locate the reflective element for completion of the one light path. The reflective unit as a box-like structure with fold down opposite ends providing reflective element leg receiving openings when folded up. Provides inexpensive structure for precise location of reflective element in repeatably precise completion of an optical path. Reflective unit in a system for sequentially recording images of two scenes on mutually exclusive areas of a sheet of photographic material.

1 Claim, 8 Drawing Figures

PHOTOGRAPHIC APPARATUS INCLUDING RESILIENT MIRROR MOUNT

This is a division of copending application Ser. No. 78,032, filed Oct. 5, 1970, now U.S. Pat. No. 3,641,886.

BACKGROUND OF THE INVENTION

1. Field of Invention

This invention relates to optical systems, to an improved reflective device in such systems, and to a camera system for producing identification cards, as an improved combination including such a reflective device.

2. Description of the Prior Art

Quality optical systems require precision location of their various elements, especially when the use of such elements relates to optical system planes, or light path directions. One such element is often a light reflector. Expensive structure and procedures, as well as highly skilled artisans, are ordinarily needed to properly form and assemble reflector elements in precision optical systems.

This is particularly true in situations such as the present camera system example, where a light reflector unit is structured and adapted for movement in and out of a photographic light path, in the course of operation of such a camera system. Each time the reflector unit is moved into the light path as an operative part thereof, it must again be precisely located. Such a movement structure could, ordinarily, be even more expensive.

There is a great need today for optical systems of excellence, which can be obtained for low price, and used inexpensively. The camera system of this disclosure is a good example of embodiment of this need.

Communication of ideas, for information and identification is very important today. With pictures, such communication can be universal. With inexpensive yet precision equipment, quality communication can be available to the many.

This invention provides means for inexpensively moving and repeatably precisely relocating a reflective element in an optical system, such as that of a quality camera.

In relation to the camera of this disclosure, and in terms of its prior art, it is frequently necessary to present different types of information on a single format. One common requirement of this nature is an identification card which includes both a photograph of the subject and certain printed data concerning the subject and issuing agency. Until recent years, identification cards of this type had generally been produced by first taking a photograph of the subject and later cutting and pasting that photograph onto a card containing the pertinent information in printed form. This type of operation normally resulted in the subject receiving his identification card a number of weeks after being photographed. Another disadvantage associated with these earlier identification card producing techniques was the continuous hazard that the issuing agency might put a photograph on the wrong card causing considerable confusion in the agency's records. Additionally, if the photograph proved unsatisfactory when returned in fully processed form, it was necessary to recall the subject in order to procure a satisfactory photograph.

Systems are now available which facilitate the simultaneous photographic reproduction of images of the subject and the desired information on a single sheet of photographic material. One such system is presently marketed by Polaroid Corporation of Cambridge, Massachusetts, which produces the recorded images on a single photograph in full color in 60 seconds. In another 60 seconds, the card produced by that camera system can be laminated with an overlay of transparent plastic material and sealed in a protective transparent pouch. There is no need to recall the person at a later date for a retake because the card did not turn out perfectly. The subject leaves with a positive, permanent means of identification. A temporary card is not required, nor is there any delay waiting for the completed card to be delivered. Also, there is no expense in handling the card at a later date, such as costs associated with obtaining records from files and card delivery or pick-up.

No special skills are required to operate identification card systems of this type, which can be run by anyone who has the manual dexterity to manage a simple office machine. Such a system can provide as many as 200 sealed full color identification cards in a period of one hour.

These systems are presently enjoying extensive use in a number of states for purposes of producing drivers licenses. Additionally, they are being employed by numerous government agencies, colleges, and private companies to provide tamper-proof means of identification.

Systems of this type are generally designed to produce identification cards having a fixed format. More specifically, each system produces an identification card of a given size on which both the size and position of the subject image are fixed. Obviously, it would be highly advantageous if such systems were adapted to produce identification cards having varying formats. For instance, different users may each have a single requirement with respect to the size and location of the subject's image on the data card, but their requirements in this respect many differ one from the other. Consequently, it is highly desirable that the manufacturer be able to make simple inexpensive variations in a basic system configuration to satisfy the special requirement of each such user. Also, certain users are interested in producing identification cards for different purposes wherein the size and/or location of the subject's image is changed. A system which can be modified, when desired, to change the identification card format would greatly reduce the capital expenditure which such users make in order to meet such demands.

This invention provides an improved system of this nature, in that a unique light reflection unit is presented, and is set forth by way of illustration in a combination of such a camera system.

Including the illustrated preferred embodiment of the reflector unit, the camera system of this invention is adapted to improvedly photographically produce an identification card having a first section on which a photograph of the subject is presented and a second section on which certain information concerning the subject and the issuing agency is presented. This system is adapted to produce identification cards of differing formats.

Except for the special form of light reflective unit and its associated structure, the camera system of this invention is the subject of copending application Ser. No.

863,562 of John F. Pasieka filed Oct. 10, 1969 and is described in greater detail therein.

An object of this invention, therefore, is to provide an improved reflective unit for optical systems.

Another primary object of this invention is to provide an improved camera system of the type indicated, which includes such an improved reflective unit.

Other objects and advantages will be in part apparent and in part pointed out hereinafter and in the accompanying drawings.

Figure 1:
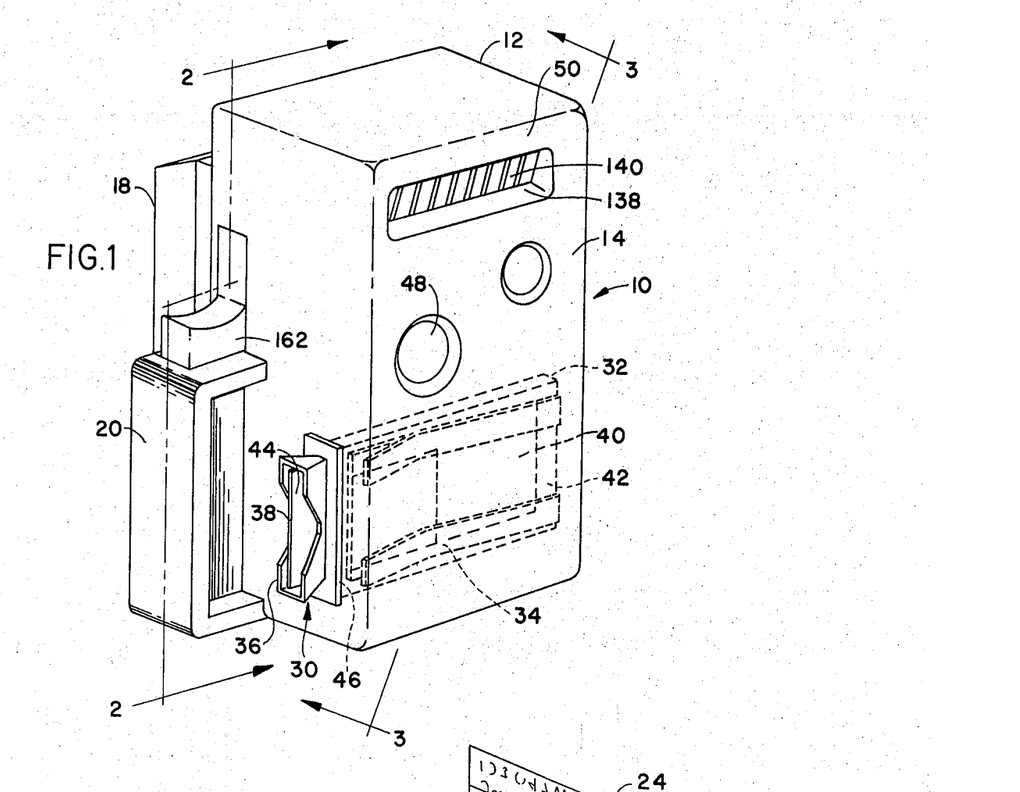
FIG. 1 is a diagrammatic perspective view of a camera system according to this invention.

An embodiment may best be understood by first referring to FIG. 1 of the drawing which illustrates a camera system 10 capable of photographically producing identification cards depicting a photograph of the subject and certain information concerning the subject and the issuing agency.

This camera system 10 comprises an opaque housing or shroud 12 including a first section 14 in which the camera's optical system is contained and a film holder 18 removably connected thereto. Extending from one side of the camera's first section 14 is a handle 20 designed to be gripped by the operator for purposes of aiming and/or supporting the camera 10 during exposure operations. Preferably, the film holder 18 is adapted to receive a film pack containing a plurality of film units which may advantageously be of the diffusion-transfer processing type, and to sequentially position the negative emulsion bearing photographic sheet 24 of each such film unit at the proper focal plane within the camera 10. Also housed within the film holder 18 are means for effecting the application of a processing fluid between the negative emulsion bearing sheet 24 and an image-receiving sheet of each film unit after exposure and as the film unit is withdrawn from the holder by the operator's pulling a tab 28 connected thereto. The specific forms of the film holder 18 and the film units contained in the film pack do not constitute part of the present invention and, for instance, may be identical to those of such items currently being marketed.

The first section 14 of the camera system 10 also includes a data card receiving and mounting arrangement 30 which facilitates the removable insertion of a card on which certain information is imprinted into the camera for purposes of photographing same. This arrangement 30 comprises a container 32 which is mounted within the camera system 10 by a spring clip 34 and which is provided with an elongated fluted opening 36 through which a data card 38 may be inserted thereinto. When fully inserted into the container 32, a portion 40 of the data card on which the information is imprinted is located in a section 42 of that container so as to be properly positioned for photographing. At such time, a second portion 44 of the data card 38 is accessible exteriorily of the camera system 10 adjacent the elongated fluted opening 36 to facilitate the subsequent removal of the card from the system. The container 32 includes a light sealed chamber 46 wherein a resiliently flexible material, such as felt, is attached to one wall of the chamber and is adapted to extend across that chamber into contact with the opposite wall thereof. This arrangement permits the data card 38 to be inserted into and withdrawn from the camera system 10 without disrupting the light sealed nature of the container's section 42. An identification card camera system employing this unique type of data card receiving and mounting arrangement is the subject of copending application Ser. No. 864,630 of Donald E. Moodie filed on Oct. 8, 1965, now U. S. Pat. No. 3,631,773, issued on Jan. 4, 1972, and is described in greater detail therein.

Figure 2:
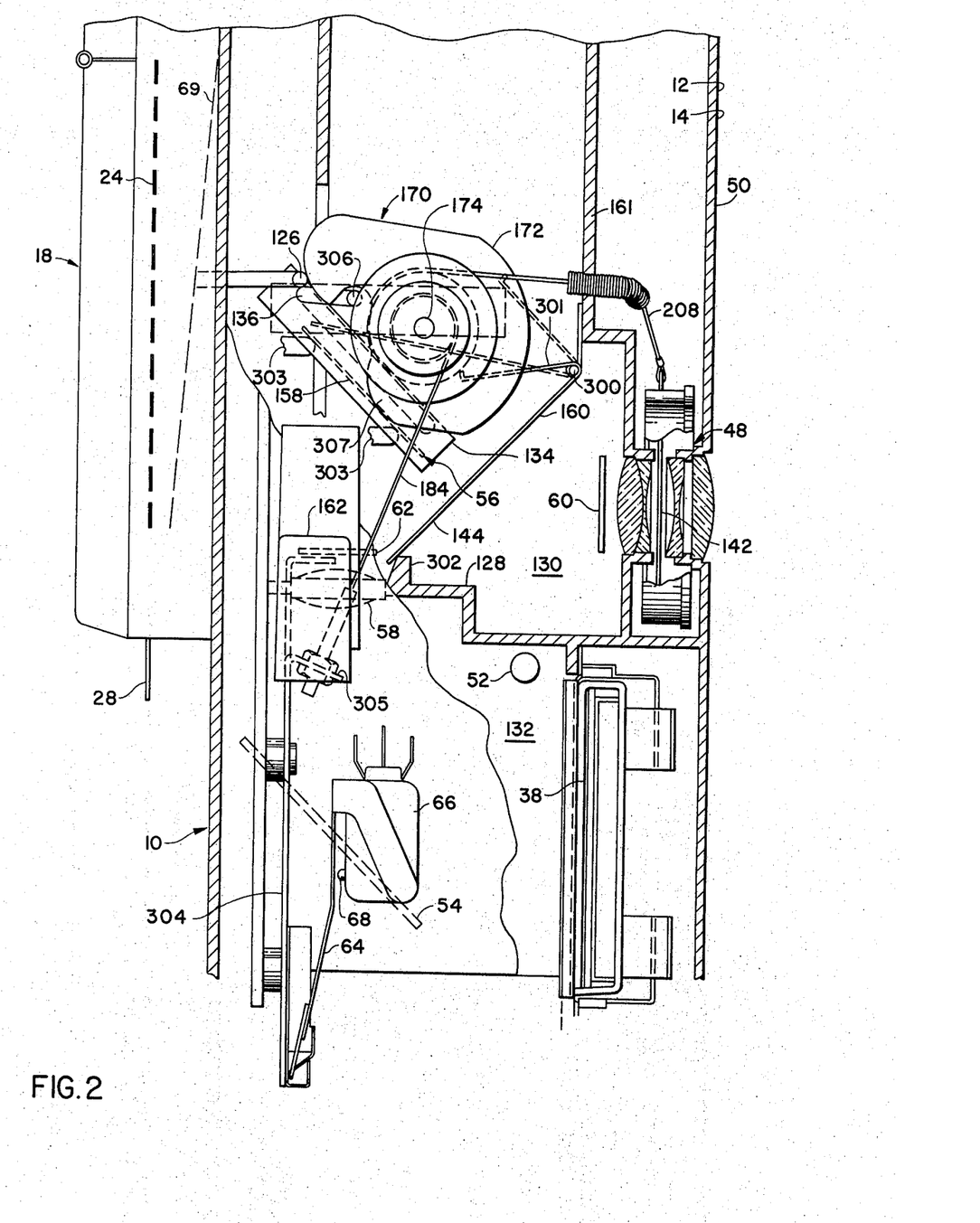
FIG. 2 is a fragmentary diagrammatic, partially cut-away, partially sectional, side elevation view taken generally along line 2 — 2 of FIG. 1.

FIG. 2 diagrammatically illustrates the optical system housed within the section 14 of the camera 10 and the operable relationship between that optical system, the data card 38 and the sheet of photographic material 24. In this figure of the drawings, the data card 38 is shown as being positioned within the camera system 10 at the proper location for photographing purposes. It will be noted that, in this embodiment, the information appearing on the data card 38 and intended to be photographically reproduced on the photographic sheet 24 is located on the generally "L-shaped" portion 40 of the card. (See FIG. 1).

An objective lens-shutter element 48 is mounted in the front face 50 of the camera system 10 to facilitate the formation of an image of a subject positioned in front of the camera on a selected section of the photographic sheet 24.

It will be noted that, when mounted in the camera system 10, the data card 38 is located below both the lens-shutter element 48 and the sheet of photographic material 24. Thus, in addition to an electronic flash unit 52, which serves to illuminate the data card 38, the camera 10 employs first and second light reflecting mirror units 54 and 56 and an objective lens 58 to facilitate the formation of an image of the data card on the sheet of photographic material 24.

Mounted adjacent the objective lens-shutter element 48 so as to intercept all of the light rays from the subject passing through that element is a light polarizer 60. Similarly, a second light polarizer 62 is mounted adjacent the objective lens 58 so as to intercept all of the light rays from the data card 38 passing through that element. Importantly, the transmission axes of these two polarizers 60 and 62 are orthogonally aligned with respect to each other. The purpose for this arrangement will subsequently be explained in detail. At this point, it should be noted that the flash unit 52 is energized through a conventional circuit (not shown) whenever the arm 64 of a microswitch 66 is seated against the actuator 68 of that switch.

Figure 4:
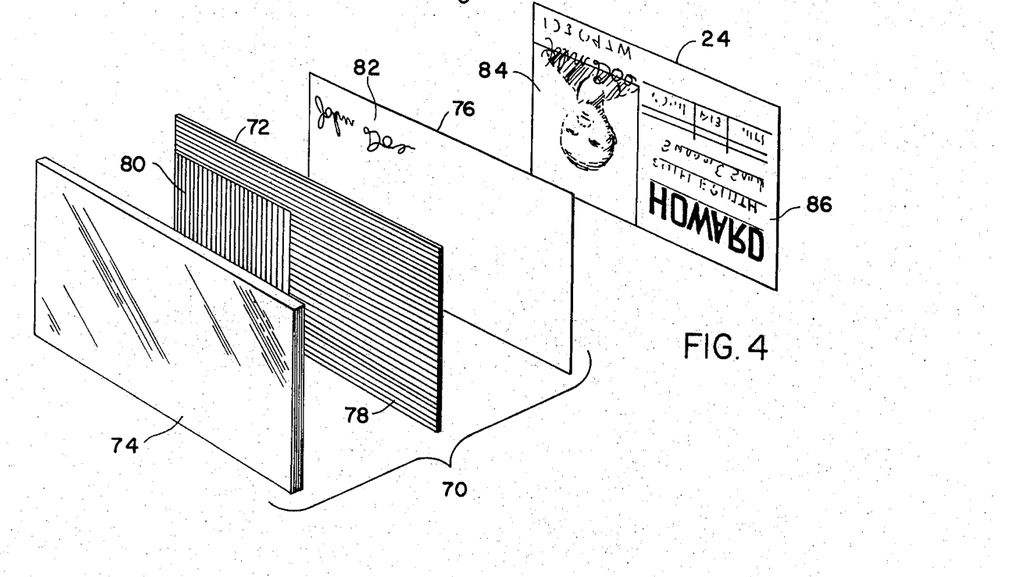
FIG. 4 is a diagrammatic exploded perspective view of a section of the validation and polarizing plate forming part of the camera system of FIG. 1 and illustrating the operable relationship between that plate and a section of a sheet of photographic material mounted in such system.
Figure 5:
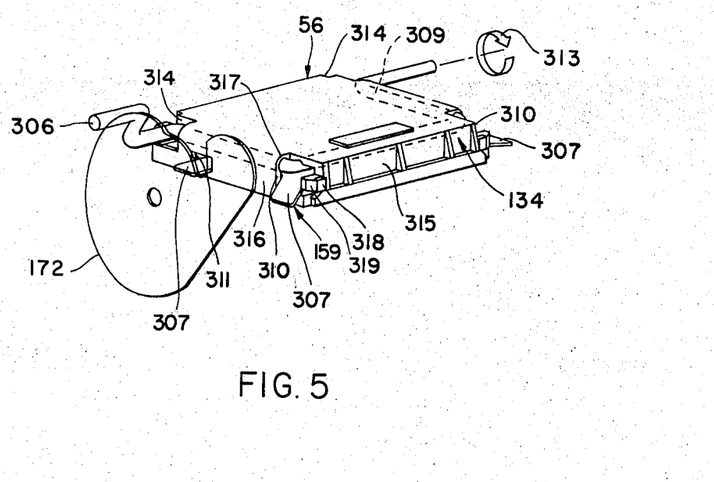
FIG. 5 is a perspective of the reflector unit of FIG. 2, and associated cam structure.
Figure 6:
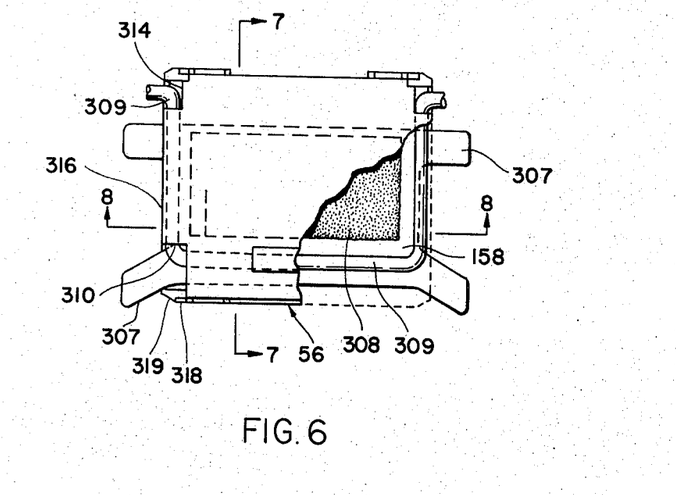
FIG. 6 is a plan view of the reflector unit of FIGS. 2 and 5, in the sense that the reflector element itself faces downward.
Figure 7:
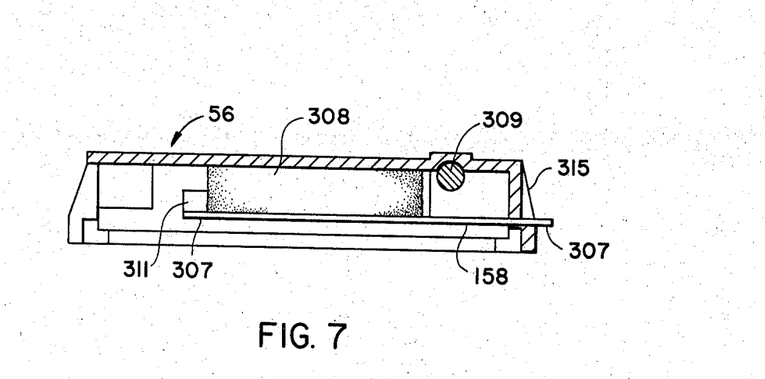
FIG. 7 is a sectional view of the reflector unit of FIG. 6, taken on line 7 — 7 of FIG. 6.
Figure 8:
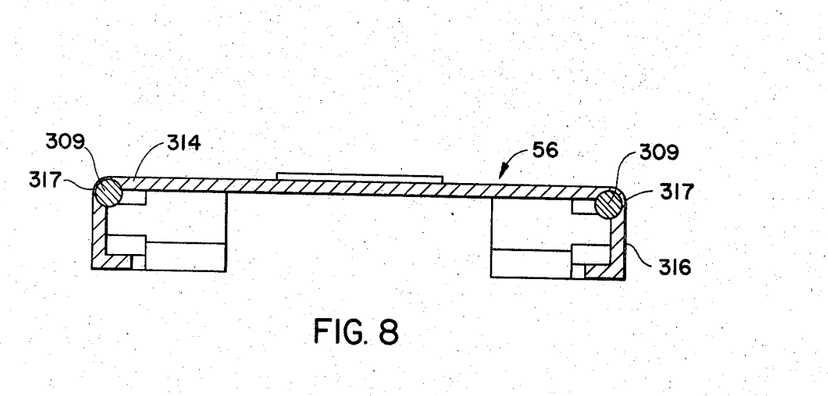
FIG. 8 is a side view of FIG. 6, taken from the right thereof.

Within the film holder 18 in FIG. 2, the camera system 10 is provided with a polairzing plate 69, shown as a dotted line, which is adapted to be displaced into a position wherein it is seated against and overlies the sheet of photographic material 24, prior to the time the images of the data card 38 and the subject are formed on the photographic sheet. In FIG. 4 of the drawings, a section 70 of this polarizing plate 69 has been exploded to more clearly illustrate the various components of which it is formed. It should be understood that in the illustrated camera system 10, conventional means are employed to slideably mount the film holder 18 to the back of the camera's first section 14. In this manner, two identification cards may be produced from each photographic sheet 24. Therefore, in this particular system, each plate 69 includes two such sections 70, each adapted to overlie approximately one-half of a photographic sheet 24. With the film holder 18 in its position shown in FIG. 2, the lower half of the sheet 24 may be employed to produce a first identification card. Subsequently, the film holder 18 may be slideably displaced downwardly along the back of the camera's first section 14 to bring the upper half of the sheet 24, overlaid by a second section 70 of the plate 69, into position for photographic operations.

As shown in FIG. 4, a sheet 72 of polarizing materials is sandwiched between a pair of transparent support plates 74 and 76. The polarizing plate 69 overlies and is positioned in close proximity to the sheet of photographic material 24 when the subject and data card are being photographed. Consequently, the illustrated section of the sheet of polarizing material 72 may have approximately the same dimensions as the finished identification card. In the illustrated embodiment, this sheet 72 comprises a first generally "L-shaped" section 78 having its transmission axis aligned with that of the second light polarizer 62 and a rectangularly shaped section 80 having its transmission axis aligned with that of the light polarizer 60. The former section 78 has the same size and shape of a section of the photographic sheet 24 which it is adapted to overlie and on which the data card image is intended to be recorded, while the latter section 80 has the same size and shape of another section of the photographic sheet 24 which it is adapted to overlie and on which the subject's image is intended to be recorded. Conventional means may be employed to fabricate the sheet of polarizing materials 72. For instance, this sheet 72 may comprise a lamination of polyvinyl alcohol sheets, each having been stretched and molecularly oriented so as to be birefringent, appropriately dyed and printed in accordance with current techniques to provide the aforementioned sections 78 and 80 with orthogonally aligned transmission axes. Alternately, other conventional forms of polarizing sheet material may be cut, aligned and mounted on a suitable transparent support.

The support plates 74 and 76 may be formed with any suitable material, such as an acrylic lucite or a glass, and appropriately adhered to the opposed faces of the sheet 72. These support plates 74 and 76 not only serve to support the sheet of polarizing materials 72 but also serve to protect that sheet from foreign matter, abrasion, etc. Also, the support plate 76 may be provided with indicia 82, such as a validating signature, company name, trademark or other symbol, which it is intended to photographically reproduce on the sheet of photographic material 24. In this respect, such indicia may be hot stamped in an opaque ink into a surface of the support 76. Preferably, it would be stamped into the surface of that support plate 76 intended to be mounted adjacent the sheet of photographic material 24 and at a position thereon where it would be recorded in part on each of the sections thereof referred to above. When disposed in its position against the sheet 24, the sections 78 and 80 of the sheet of polarizing materials 72 respectively overlie the proper sections of the photographic sheet 24. To minimize any distortion of the images, it is desirable that the support plate 76 be relatively thin.

It will thus be appreciated that the polarizing plate 69, in combination with the light polarizers 60 and 62, serves to effectively limit the light rays intersecting one section of the sheet of photographic material 24 to those from the subject and to limit the light rays intersecting the other section of the sheet of photographic material to those from the data card 38. Further, it is naturally desirable that light rays from the data card 38, which are polarized by the element 62, be directed effectively and efficiently onto the appropriate section 86 of the photographic sheet 24. As indicated, at the same time, it is desirable that section 80 of the sheet 72 preclude any such rays from impinging upon section 84 of the photographic sheet 24. Consequently, the polarization characteristic of such light rays should not be distorted or changed to any extent intermediate the element 62 and the sheet 72. In this respect, the alignment of the mirror 158 and the polarizing element 62 is preferably such that the transmission axis of that element is parallel to the plane of the mirror. Any deviation from this type of alignment could result in a component of the light rays being oriented parallel to the transmission axis of section 80 of the sheet 72, whereby such component would pass through that section of the sheet 72 onto section 84 of the photographic sheet 24. This particularly advantageous system for effecting such a result is the subject of copending application Ser. No. 49,960 of Bruce K. Johnson filed on June 25, 1970.

In order to reduce the pull force which must be exerted by the operator on the tab 28 to effect the removal of each film unit from the film holder 18 and, further, to preclude scratching the exposed surface of the photographic sheet 24 at such time, it is desirable that the polarizing plate 69 be positioned out of contact with an exposed photographic sheet whenever such a sheet is being withdrawn from the film holder. Consequently, the polarizing plate 69 is mounted within the camera system 10 for selective displacement between a position out of contact with the photographic material 24 and a position in contact with the photographic material.

In FIG. 2, an arm 126 is releasable by movement of a cam 172 to trigger such displacement. This significantly advantageous system for effecting such a result is set forth in copending application Ser. No. 864,632 filed on Oct. 8, 1969, by John F. Pasieka for Identification Card Camera System Capable of Producing Cards Having Different Formats, now U. S. Pat. No. 3,696,716, issued on Oct. 10, 1972.

It will be noted that the data card objective lens 58 is mounted in an opaque internal wall member 128 of the camera system 10, which wall member effectively serves to divide the first section 14 of that system into two separate chambers 130 and 132. Fixedly positioned within the chamber 132 is the electronic flash unit 52 and the first light reflecting unit 54 which, as indicated, in combination with the reflecting unit 56, facilitate the formation of an image of the data card 38 on the sheet of photographic material 24. The microswitch 66, which serves to selectively energize the flash unit 52 is located outside of and adjacent to the chamber 132, and the second light reflecting element 56 is mounted within the chamber 130. At the time the data card 38 is photographed, light rays from that card are reflected by the light reflecting unit 54 through the lens 58 and the light polarizer 62 onto the light reflecting unit 56, which redirects those light rays towards the sheet of photographic material 24. Since at this time the light reflecting unit 56 is positioned in the optical path between the objective lens-shutter element 48 and the sheet of photographic material 24, this unit 56 is displaced into its position shown on phantom in FIG. 2 subsequent to the formation of the data card image on the sheet of photographic material 24 and prior to the formation of the subject's image on that sheet. In this connection, the light reflecting unit 56 has a box frame 134 which is mounted for pivotal movement about a rod 136.

Located in the chamber 130 of the camera system and positioned in operable relationship with an opening 138 in the front face 50 of section 14 is a second electronic flash unit 140 which, in cooperation with the objective lens-shutter element 48, facilitates the photographing of a subject positioned in front of the camera. In this respect, the flash unit 140 illuminates the subject and an image of that subject is formed by the objective lens of the element 48 on the sheet of photographic material 24. A conventional arrangement may be employed to energize the flash unit 140 whenever the shutter 142 of the objective lens-shutter element 48 is activated.

As in the case of the film holder 18, the film units contained therein and the arrangement for activating the shutter 142, the lens element 58 and the lens-shutter element 48 and the flash units 52 and 140 do not by themselves constitute a part of the present invention. Consequently, these components of the system may take conventional or special forms other than as illustrated in the drawings within the scope of the present invention.

In order to preclude light rays from being reflected by the unit 56 onto the sheet of photographic material 24 during the time that the subject is being photographed, the camera system 10 includes a non-reflective baffle plate 144. More specifically, the baffle plate 144 is mounted on the structure of the camera system 10 by means of a pivot 300. This pivot 300 is located adjacent, and just above, the lens-shutter element 48, and within the chamber 130. Beyond the pivot 300, the baffle plate 144 is provided with an angled extension 301. In the initial, down position of the light reflective unit 56, the baffle plate 144 extends downwardly, beside the reflective unit 56, with its lower end against a stop 302. In this position, the angled extension 301 of the baffle plate lies above the lowered end of the light reflective unit 56. It will thus be appreciated that, as the light reflective unit 56 is rotated in a counterclockwise direction about the rod 136 as viewed in FIG. 2 of the drawings towards its position shown in phantom therein, the box frame 134 of the reflective unit 56 engages the baffle extension 301 and causes the light baffle plate 144 to be displaced in a direction towards the reflective unit 56. When the light reflective unit 56 has been fully displaced into its position shown in phantom, the light baffle plate has been displaced to its position also shown in phantom wherein it overlies the reflective surface 158 of the unit 56. The baffle plate 144 automatically returns to its original position whenever the reflective unit 56 is returned to its original position. A suitable bias spring (not shown) may be provided about the pivot 300 to insure such return, when desired. This plate 144 may be formed of any suitable material such as polypropylene or aluminum having its surface 160 coated with a flat black paint to render it non-reflective. The baffle extension may be formed of aluminum or any other substantially rigid preferably lightweight material appropriately connected to the baffle. Alternately, the baffle 144 and its extension 301 may be formed of a single piece of such material configured to provide such extensions in appropriate locations.

Importantly, and especially significant to this invention, the reflection unit 56 is movable in and out of its FIG. 2 down position. In this position, a reflection element 158 in the unit 56, is in and part of an optical path from the data card 38 to the chamber 132 reflector 54, through the objective lens 58 and the polarizer 62, to the reflection element 158, and to the photographic material 24 through the polarizing plate 69. The reflection unit 56 is thus movable so that, in its up position, FIG. 2 phantom position, and with the help of the baffle 144, the light path from the data card 38 is broken, and a light path from the subject through the lens-shutter element 48 proceeds to the photographic material 24 without any part of the reflection unit 56 being in the way. With these two light paths thus free from each other and used in sequence, significant freedom is provided in arranging for different locations, sizes, and forms of images of the data card and subject on the photographic material. This freedom facility greatly expands the uses and applications of this camera system.

It is necessary that when the reflection unit 56 is moved from its phantom up position to its down position that the reflection element, the mirror 158, be precisely properly located as a part of the data card light path. Otherwise, the data card image on the photographic material 24 could be differently located each time the reflection unit 56 is returned to its down position. Suitable return bias spring devices (not shown) may be used where needed, for example to ensure that the reflector unit 56 does return to the data card optical path.

Importantly, and as will be detailed hereinafter, the mirror 158 is resiliently mounted in the reflection unit 56, and stops 303 are provided to precisely locate the mirror 158 in the data card light path. The mirror 158 settles precisely against the stops 303 due to its resilient mounting, fully repeatably, without regard to small position differences which may occur in the body of the reflection unit 56. The stops 303 may thus be connected to a camera support member and no moving part is relied upon to establish mirror position. This constitutes an entirely static positioning system for the movable mirror 158 and most advantageously permits the mounting and actuating arrangements to be fabricated from non-precision, low-tolerance, and therefore relatively inexpensive, parts.

This situation provides the significant feature that, in a precise optical system, an element thereof may be assembled, or repeatably moved in and out of the system without loss of the integrity of the system, and without the necessity of expensive precision support structure, the precision requirement being embodied only in stop means which repeatably determine the proper mirror location.

This invention shows a camera system as a vehicle of illustration of such precision repeatability of location of an element of an optical system. Precision in optical systems is expensive when there are no moving parts. It is more so when elements of the system are to be moved in and out of the system. This invention makes such extra expense unnecessary, and promotes the important consideration of wide distribution of precise optical devices because the cost can be held down by the localization and simplification of precision requirements as demonstrated herein in the matter of repeatably locating a resiliently supported mirror element against precisely located stop means.

The illustrated embodiment of this invention includes an arrangement for automatically and sequentially displacing the polarizing plate 69 into contact with the sheet of photographic material 24, energizing the electronic flash unit 52, displacing the light reflecting unit 56 into its position shown in phantom in FIG. 2 and activating the shutter 142, all in response to an operator's manipulation of a single actuating device. In this connection, a button 162 (See FIGS. 1 and 2) is conveniently mounted on the handle 20 which may be depressed by the operator to perform the above noted functions and to thereby record images of the data card 38 and the subject on mutually exclusive sections 86 and 84, respectively, of the sheet of photographic material 24.

Figure 3:
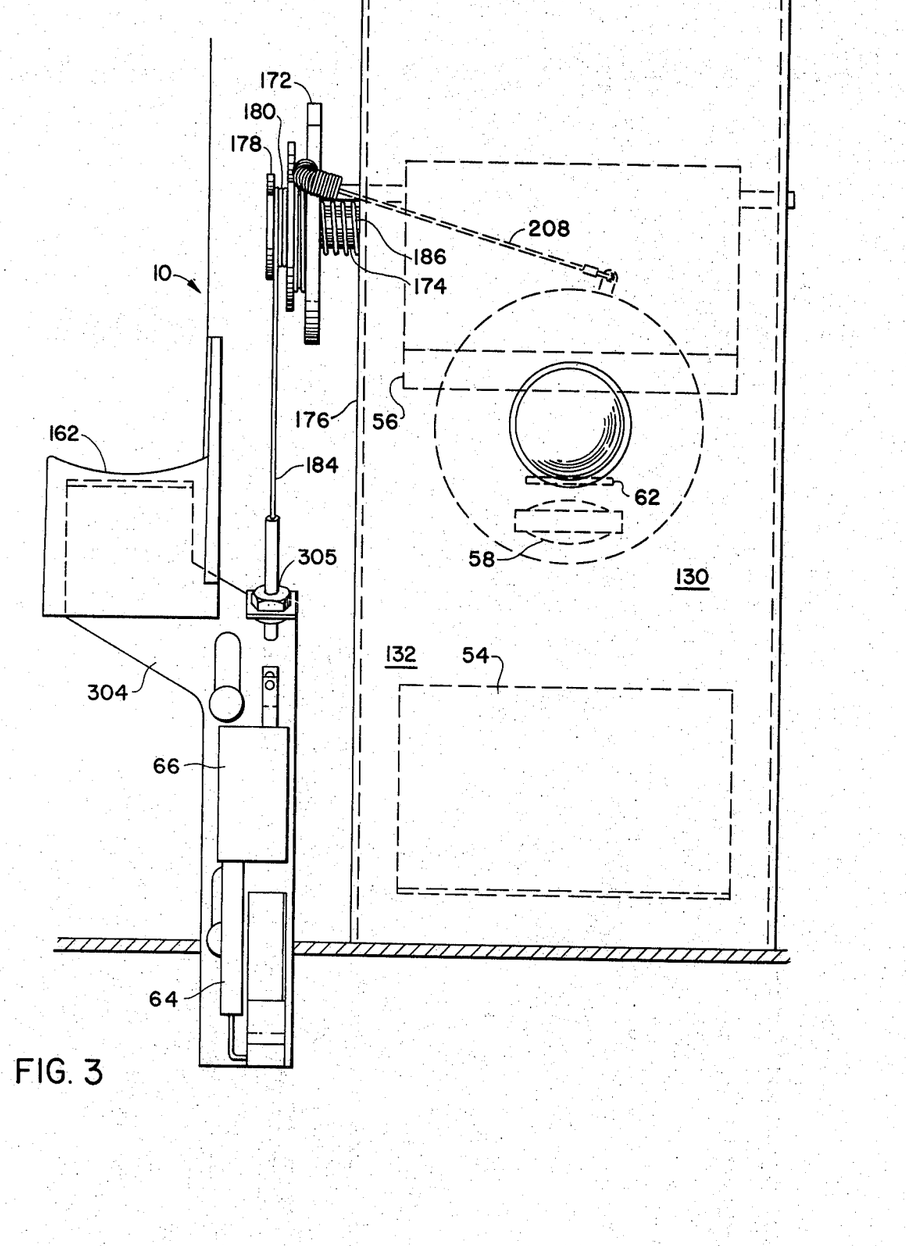
FIG. 3 is a fragmentary diagrammatic sectional front elevation view taken generally along line 3 — 3 of FIG. 1.

As may be seen in FIG. 2 and 3 of the drawings, the button 162 is connected to one end of a slide arm 304. A camming mechanism 170 is located within chamber 130 and includes a shaft 174 journaled to a frame member 176 and on which is mounted a cam 172. A pulley 178 is mounted at the end of the shaft 174 being spaced from the cam 172 so as to provide a drum 180 intermediate those two members. A flexible cable 184 extends around the drum 180 having one of its ends connected to the top end of the slide 304 and its other end connected to the drum 180. A spring 186, coiled on the shaft 174, continually urges that member to rotate in a counterclockwise direction as viewed in FIG. 2. Rotation of that shaft 174 in a counterclockwise direction may be restricted by suitable stop means for the cam 172. This may take the form of an adjustable connection 305 of the cable 184 to the slide 304. It will thus be appreciated that, whenever an operator depresses the button 162, the cam 172 is rotated in a clockwise direction as viewed in FIG. 2. Upon subsequent release of the button 162, the force of the spring 186 causes the cam 172 to be returned in a counterclockwise direction to its original position. At such time, the button 162 automatically returns to its original position, the reflection unit 56 returns to its down position and the baffle plate 144 returns to the stop 302.

In the course of the rotation clockwise of the cam 172 as a result of an operator pushing the button 162, the first action is the release of member 126 to permit spring biased movement of the polarizing plate 69 to engage the photographic material sheet 24. Thereafter, the button slide 304 moves the microswitch arm 64 to actuate the microswitch 66 and operate the flash unit 52 to initiate the formation of an image of the data card 38 on the photographic sheet 24. Further clockwise movement of the cam 172 as the button 162 is pushed further down, results in cam action against cam follower 306 to lift the reflector unit into its up position, with accompanying lifting of the baffle plate 144. Thereafter, flexible cable 208 reaches the point of actuation of the subject lens and shutter unit 48 which, in conjunction with the energizing of the flash unit 140, effects the formation of an image of the subject on the photographic sheet 24, the button 162 then being released, the various elements return to their initial position. Importantly, as this return is completed, extension legs 307 of the reflector element 158 engage the stop members 303. Under the resilience of a body 308 of springy foam material such as rubber or plastic, the reflector, mirror, element achieves its proper location for the data card light path, even though the box frame 134 of the reflector unit 56 may not be precisely aligned with such proper mirror location.

Detail of the reflector unit 56 is set forth in FIGS. 5, 6, 7 and 8. This unit comprises a box frame 134, a mirror element 158 in a box frame, a body 308 of resilient material such as foamed plastic or rubber on which the mirror 158 is mounted in the box frame, and a support and actuator rod 309. As in FIG. 5, the box frame 134 may be made of polypropylene and is in the form of a shallow, rectangular box, used as a box with an open top, with the box inverted so that the open top faces downward. The mirror 158 is a rectangular flat plate within the box 134 with a reflector surface in the open top of the box, again, as used, facing downward. The mirror 158 may be a metal plate with a mirror surface, or a plate with a mirror secured thereto. The leg extensions 307 of the mirror 158 are essentially flat continuances of the mirror plate at the corners thereof. These mirror legs extend out through the walls of the box 134 by means of corner openings 310 and end wall openings 311 in the box 134. These openings 310 and 311 are relatively deep with respect to the thickness of the mirror legs 307 so the mirror is free to tilt significantly with respect to the box 134, due to the resilient mounting. The mirror legs are engageable with stop means 303 when the reflector unit is in its down position. This positioning arrangement, i.e., the stop means 303, is entirely static in nature, permitting an inexpensive and relatively simple mounting and actuating arrangement to be provided for the mirror 158. Thus the mirror is always precisely located in the data card light path, while the box 134 may be tilted because of inexpensive construction, by shock due to repeated use or if the camera is dropped, or because of like situations. The mirror legs 307, extending through box corner openings 310, are shown as being angled somewhat outwardly and down. This is simply an accommodation to adjacent structures within the camera. The essential is mutual engagement of mirror legs and stop means to precisely locate the mirror.

A support and actuator bar 309 is provided in and for the reflector box 134 as an extension of the reflector unit cam follower 306. The bar 309 is suitably journalled (not shown) in the camera support structure, for rotation as indicated by arrow 313 in response to interaction between the cam 172 and the cam follower 306. The bar 309 enters and leaves the mirror box 134 through corner openings 314 of the mirror box 134. Within the box, as in FIG. 5, the bar 309 is in U shape, following the box walls. Thus, as the cam 172 moves the cam follower 306, the rod 309 is rotated, arrow 313, and the reflector unit 56 is correspondingly rotated.

The mirror box 134 may be a one piece plastic body with essentially rigid side walls 315 and end walls 316 which are latch-locked at the box corners and which are releasable and foldable outward on living hinges indicated at 317. As in FIG. 5, such latching is tightly accomplished through block means 318 as unitary parts of the end walls 316 secured with latch finger means 319 as unitary parts of side walls 315. This tight latching is easily releaseable since the latch fingers 319 are flexible extensions of the rigid side walls 315.

In assembling the reflector unit 56, the end walls 316 are folded down (up, in FIG. 5) on hinges 317. The actuation bar 309 is placed in the box, in a channel therefor, of which the hinges 317 are a part. The mirror is placed in the box, against the block 308 of resilient material. The end walls 316 are then folded up (down, in FIG. 5). This action places the mirror legs in box corner openings 310 and end wall openings 311, and the actuator bar 309 in box corner openings 314. The actuator bar is peripherally grasped and held by the hinges 317 configuration.

This invention, therefore, provides novel and unique means for mounting and repeatably locating optical elements in light paths of optical systems. An illustrative application is in movable mirror construction in a photographic system for sequentially photographing a subject and a data card.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. For use in an optical system defining an optical path, a mirror comprising a plate having a generally rectangular portion formed on one side with a mirror surface and having integral foot extensions from the corners of said rectangular portion, support means forming a shallow generally rectangular box-like housing having a front wall, means forming an opening in said front wall, a rear wall confronting said opening, and side walls joining said front and rear walls and formed with apertures for receiving said foot extensions with clearance, said mirror being located in said housing with said mirror surface being exposed in said opening and said foot extensions protruding through said apertures so that said mirror has limited freedom to move in said housing, a block of resilient material mounted in said housing between said mirror and said rear wall and resiliently urging said mirror toward said first wall, precision stop means fixed relative to said optical path, and means mounting said support member for movement between a first position, in which said foot extensions engage said stop means in a predetermined position in said path determined by said stop means and variable relative to said first position by deflection of said block of resilient material, and a second position in which said mirror is out of said optical path.

* * * * *